United States Patent [19]
Schmidt

[11] 3,873,129
[45] Mar. 25, 1975

[54] STEERABLE TRAILER
[75] Inventor: Kenneth J. Schmidt, Thruston, Oreg.
[73] Assignee: General Trailer Company, Inc., Springfield, Oreg.
[22] Filed: Aug. 13, 1974
[21] Appl. No.: 497,093

[52] U.S. Cl.......... 280/404, 180/79.2 B, 280/DIG. 9, 280/463
[51] Int. Cl............................................. B62d 53/00
[58] Field of Search ...... 280/404, DIG. 9, 463, 468; 180/79.2 B

[56] References Cited
UNITED STATES PATENTS
2,376,296   5/1945   Walter ........................... 280/DIG. 9
3,027,959   4/1962   Mailliard ........................ 280/404 X
3,350,116   10/1967  Skirvin ........................... 280/404
3,370,866   2/1968   Mitchell .......................... 280/404
3,788,672   1/1974   Tharp ............................. 280/404

Primary Examiner—Leo Friaglia
Attorney, Agent, or Firm—Kolisch, Hartwell, Dickinson & Stuart

[57]     ABSTRACT

A steerable log trailer including a log bunk, and a frame mounting the bunk and supported for travel over the ground. Pivoted on the frame for generally horizontal swinging relative thereto is a reach guide which accommodates coupling of the trailer to a towing vehicle. Hydraulic rams act between the reach guide and frame to adjust the relative angular positions thereof. The frame is constructed whereby none of the weight of any load received in the bunk at any times passes through either the reach guide or through the means pivoting the reach guide on the frame.

10 Claims, 5 Drawing Figures

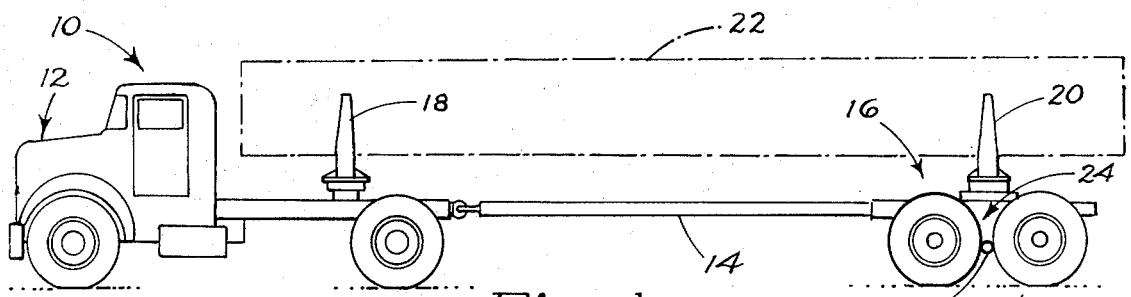
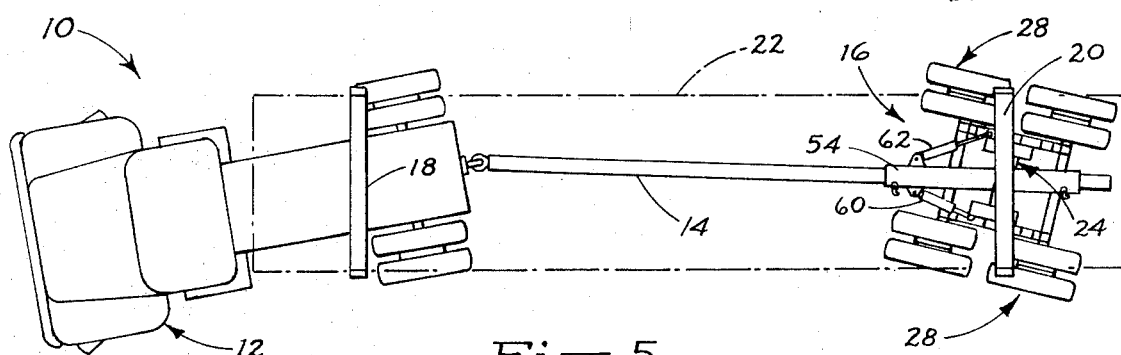
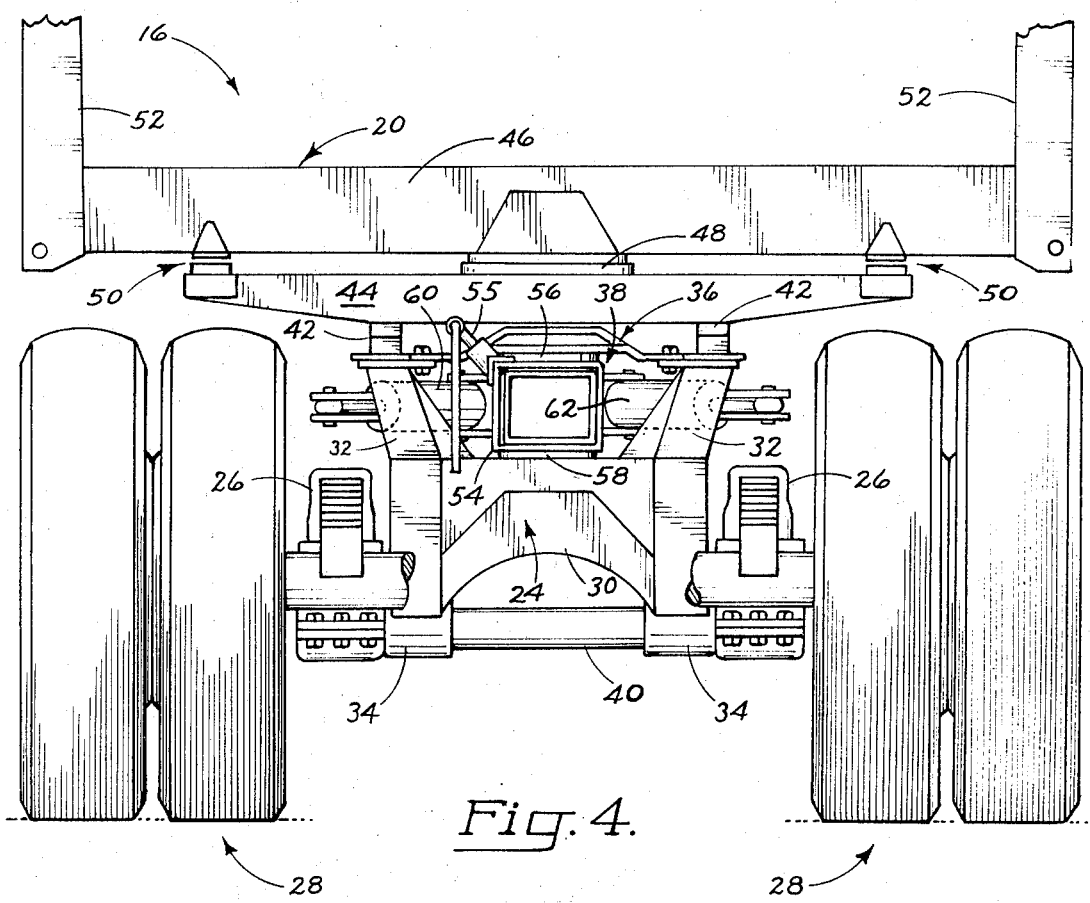

3,873,129

STEERABLE TRAILER

BACKGROUND AND SUMMARY OF THE INVENTION

This invention pertains to a steerable trailer usable with elongated loads such as logs, transmission line poles, beams (e.g., concrete, steel and others), etc. For the purpose of explanation herein, a preferred embodiment of the invention is described in the form of a steerable log trailer in which setting the invention has been found to have particular utility.

Steerable log trailers have been available for many years. Such a trailer typically includes what might be thought of as upper and lower frame sections interconnected through a ring bearing which permits relative rotation between the sections about a generally upright axis. Secured to the upper section, ordinarily, is the usual reach guide which accommodates coupling of the trailer to a towing vehicle. One or more hydraulic motors normally act between the upper and lower frame sections to effect relative rotation therebetween—which rotation causes steering of the trailer. The lower frame section is supported for travel over the ground through the usual suspension and wheel assemblies. Logs carried by the trailer are received in a log bunk which is mounted through another ring-type bearing on the top of the upper frame section. This second-mentioned bearing enables some relative swinging of the bunk to take care of log movement in the bunk.

This kind of construction, for a number of reasons, has not been entirely satisfactory. To begin with, both of the ring bearings mentioned form part of the path in the trailer through which the weight of any load borne by the bunk is transmitted to the ground. Hence, it is necessary that relatively massive bearing parts be used in order to be capable of handling the maximum load expected to be carried by the trailer. Further, relatively massive support structure must be provided, obviously, for mounting each of these bearing parts. A consequence of this situation is that the overall trailer tends to be extremely heavy, and includes a number of bearings which, because each must carry a full load borne by the bunk, are subject to high wear and maintenance problems. Another consequence, is that operation of the hydraulic motors to steer the trailer requires energy not only to effect such steering but also to overcome that friction introduced into the bearings by virtue of the load on the trailer. Yet another and related consequence is that this type of construction can be quite costly.

While the overall cost of the trailer is, of course, of some concern to a prospective purchaser, a far greater concern is overall trailer weight. The greater the weight of a trailer, the less load it can lawfully carry on highways. Hence, it is always desirable to achieve minimum weight in a trailer without, of course, affecting its carrying capacity.

A general object of the present invention is to provide a unique steerable trailer construction which takes the above considerations into account in a highly practical and satisfactory manner.

More specifically, an object of the invention is to provide such a trailer which, when compared with a conventional trailer with the same carrying capacity, is considerably simpler in construction, lower in cost, and significantly lower in overall weight.

According to a preferred embodiment of the invention, a steerable trailer is proposed which includes a load bunk mounted through a conventional ring bearing on the top of a unitary (e.g., single-section) frame which is conventionally supported for travel over the ground. Pivoted on the frame for generally horizontal swinging relative thereto is a reach guide, of the type mentioned above, accommodating coupling of the trailer to a towing vehicle. Hydraulic rams act between the reach guide and the frame to adjust the relative angular positions thereof, whereby steering of the trailer takes place. The frame is constructed in such a manner that none of the weight of any load received in the bunk at any time passes through either the reach guide, or through the means which pivots the reach guide on the frame. In other words, neither the reach guide nor its pivot means form part of the path in the trailer through which load in the bunk is transmitted to the ground.

This kind of construction obviates the necessity for a massive ring bearing of the type first mentioned above. Hence, a significiant weight reduction is achievable in the proposed construction, accompanied, of course, by an appreciable cost reduction, as well as a minimization of maintenance problems.

These and other objects which are attained by the invention will become more fully apparent as the description which follows is read in conjuction with the accompanying drawings.

DESCRIPTION OF THE DRAWINGS

FIG. 1 is a simplified side elevation of a logging truck including a steerable trailer constructed in accordance with the present invention.

FIGS. 2, 3 and 4 are enlarged fragmentary side elevation, top plan, and rear elevation views, respectively, showing details of the trailer in the truck of FIG. 1.

Figure 3:
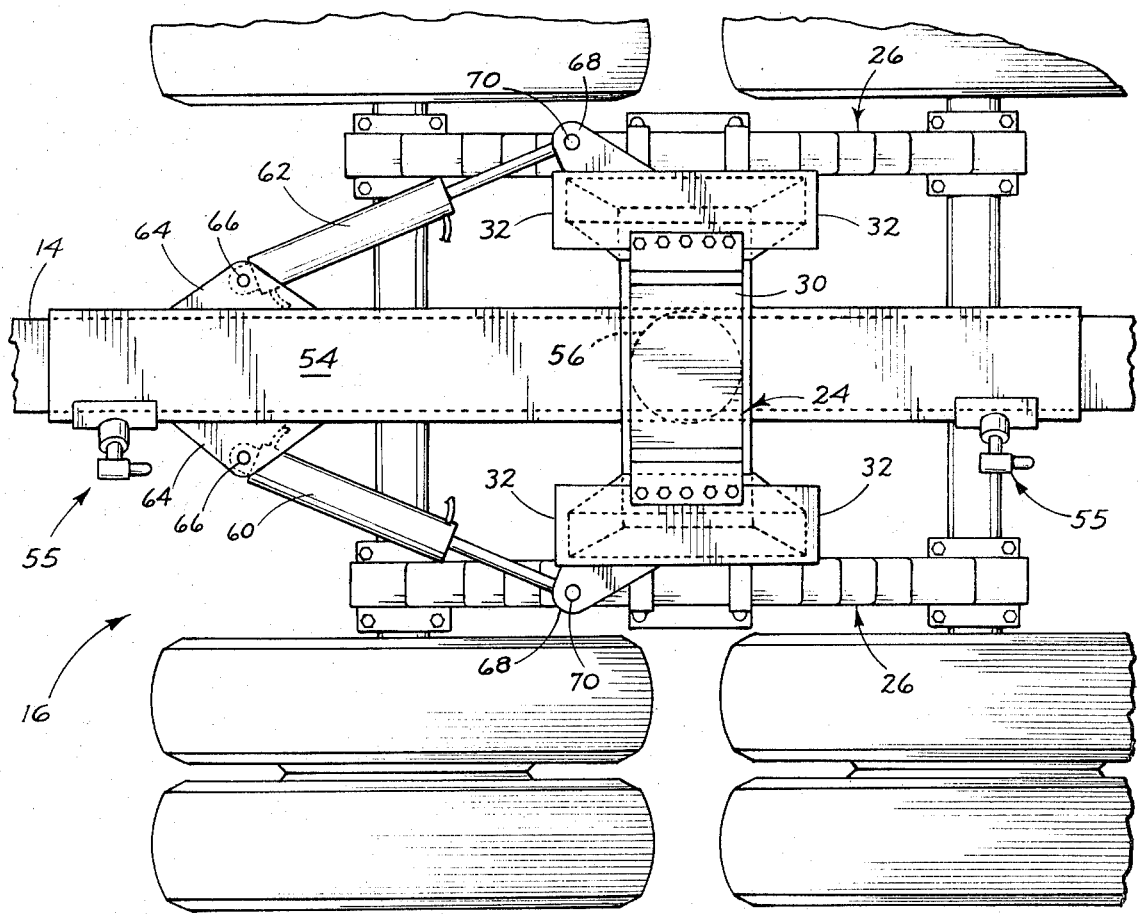

And, FIG. 5 is a simplified top view, on about the same scale as FIG. 1, illustratitng a steering operation.

DETAILED DESCRIPTION OF THE INVENTION

Turning now to the drawings, and with reference first to FIG. 1, indicated generally at 10 is a logging truck including the usual tractor 12 coupled through the usual reach 14 to a steerable trailer 16 which is constructed in accordance with the present invention. Mounted in the usual manner on the frame in truck 12 is a conventional log bunk 18. A similar bunk 20, also referred to herein as a load-receiving means, is mounted as will be described in trailer 16. A load of logs 22 is shown in dash-dot outline being carried by the truck.

Figure 2:
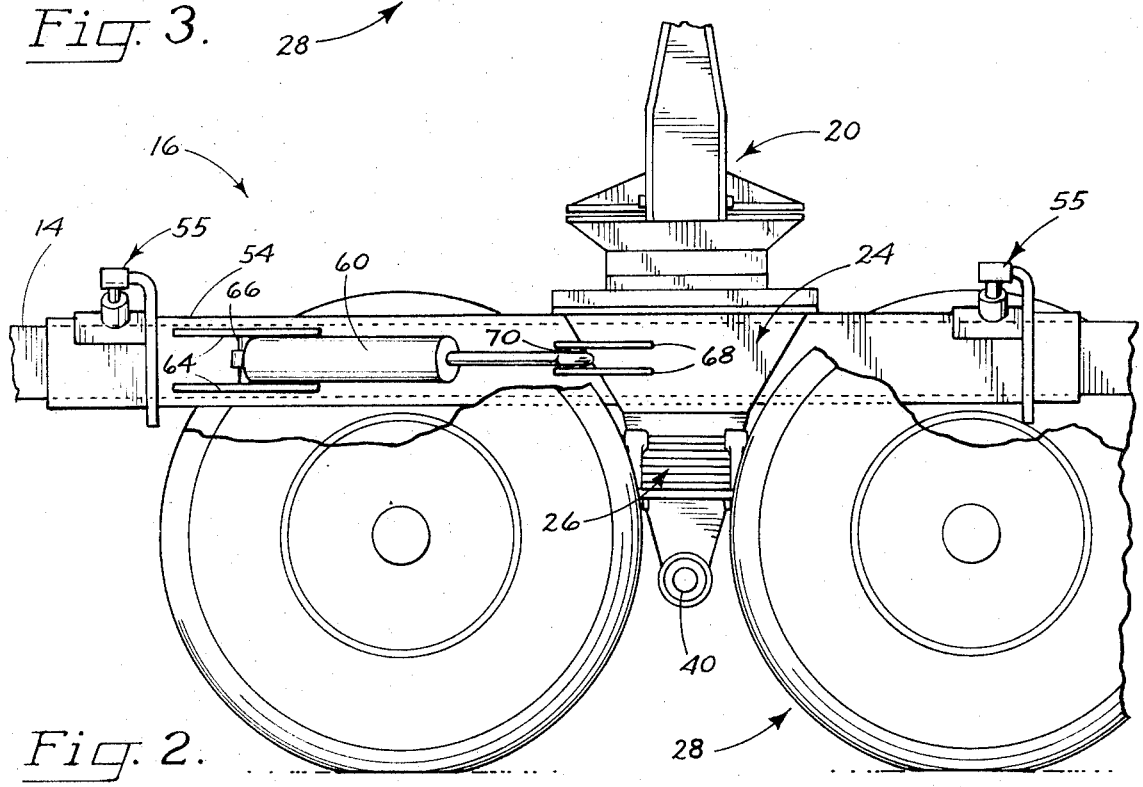

FIGS. 2, 3 and 4 show details of construction of trailer 16, and turning now to these figures, the trailer includes a frame 24 supported through the usual leafspring suspensions 26 and sets of wheel assemblies 28 for travel over the ground. These suspensions and wheel assemblies are also referred to herein as a ground-traveling support means. The suspensions, along with the wheel assemblies and frame 24, constitute a load-transmitting means.

Frame 24 herein includes a main central portion 30 from laterally opposite sides of which project upwardly and outwardly extending arms 32, and downwardly extending legs 34. Plate structure 36 is joined to and bridges the tops of arms 32. All of the parts in the frame are suitably formed of plate steel to have the configurations shown in the figures. While different specific configurations could of course be used, the one which is shown has been found to make an efficient use of its forming material. In other words, the illustrateed construction seems to offer maximum strength for minimum mass and weight. Frame portion 30, arms 32 and plate structure 36 define a longitudinal opening 38 which extends through the frame. The purpose of this opening will be explained shortly.

Previously mentioned suspensions 26 are attached to legs 34 through an elongated transversely extending shaft 40 which accommodates fore and aft rocking of frame 24 relative to the ground.

Secured as by bolting on top of plate structure 36, immediately above the upper ends of arms 32 are a pair of conventional electromechanical load cells 42 on top of which is mounted an elongated, transversely extending conventional log bunk bolster 44. All loads carried through the bolster are transmitted to frame 24 through the load cells. These load cells, whose constructions are not described herein, are provided for the usual monitoring of the weight of the load carried by the trailer. Previously mentioned bunk 20 includes the usual crossbar 46 which is mounted through a ring bearing, or pivot means, 48 centrally on the top of bolster 44. This ring bearing accommodates generally horizontal swinging of the crossbar about an upright axis through the bearing. Mounted in the usual manner adjacent the opposite ends of the bolster, and on both the upper side of the bolster and the lower side of the crossbar are the usual sets of normally disengaged wear shoes shown at 50. Also included in bunk 20, pivoted adjacent the outer ends of crossbar 46, are the usual stakes 52.

Indicated at 54, in FIGS. 2 3 and 4, is a conventional elongated reach guide 54 adapted for receiving the rear end of a reach, such as reach 14. Guide 54 herein takes the form of the usual elongated hollow rectangular cross section tube. Reach 14 is received within guide 54, and is clamped therein through conventional reach clamps 55 provided adjacent opposite ends of the guide.

As contemplated by the present invention, guide 54, also referred to as a coupling member, extends through opening 38 in the frame, and is pivoted on the frame through upper and lower ring bearings 56, 58, respectively. These two ring bearings are also referred to herein individually as pivot mechanisms, and collectively as a pivot means. Bearings 56, 58 are considerably less massive in construction than previously mentioned bearing 48. Bearing 56 interconnects the upper side of the reach guide with the underside of plate structure 36. Similarly, bearing 58 interconnects the lower side of the reach guide with the upper side of frame portion 30. These two ring bearings are vertically aligned, and accommodate generally horizontal swinging of the reach guide about their common rotational axis.

Completing a description of trailer 16, provided for adjusting the relative angular positions of the reach guide in the frame are two double-acting hydraulic motors 60, 62. The cylinder ends of these motors are connected to laterally opposite sides of the forward end of the reach guide through brackets 64 and pivot pins 66. The rod ends of the motors are connected through brackets 68 and pivot pins 70 to the outer sides of frame arms 32.

Suitable hydraulic connections (not shown) are provided for the opposite ends of the cylinders in the motors, with these connections leading to a conventional valved supply of hydraulic pressure fluid provided in tractor 12. Motors 60, 62, which are also referred to as interconnecting means, along with bearings 56, 58 and guide 54 are called herein collectively a steering mechanism.

A key feature of the invention is that neither reach guide 54 nor bearings 56, 58 carry at any time any of the vertical load transmitted from bunk 20 to the ground. Rather, such a load is transmitted from the bunk through bearing 48, and occasionally through one or more of the sets of wear shoes, to bolster 44, which in turn transmits this load through cells 42 directly to the arms in frame 24. Such load is carried by the arms directly downwardly through the frame, and thence through legs 34 into the suspensions, which then transmit the load to the ground through wheel assemblies 28. Hence, there is no frictional component introduced into bearings 56, 58 by virtue of any load carried in the bunk. Also, since none of such a load must be carried by bearings for the reach guide, these bearings need only be sturdy enough to support the reach guide for the swinging movement required of it. As a consequence, a significant reduction in weight in the trailer results.

Steering of the trailer is accomplished in a manner which will now be obvious, e.g., simply by adjusting the relative overall lengths of motors 60, 62. When it is desired to use the trailer in a "steering" mode of operation, and assuming that a left turn is required, motor 60 is contracted, and motor 62 extended by about the same amount, to produce the desired angularity between the reach guide and frame. The valving provided for operating these motors is then adjusted to lock the motors with the desired lengths so as to fix the relative angular positions of the reach guide and frame. FIG. 5 in the drawings, which is a simplified top view of truck 10, illustrates a left turn steering operation. A right turn is performed, of course, by extending motor 60 and contracting motor 62.

It will thus be obvious that a steerable trailer is provided which offers all of the features and advantages discussed earlier. Only a single massive load bearing need be provided in the trailer, inasmuch as unitary frame 24 is constructed to transmit, about the reach guide and its mounting, all of any load carried by bunk 20. Lightweight structure and greater simplicity is thus readily attained by the trailer. Further, maintenance problems are significantly reduced since only a single bearing, e.g., bearing 48, is subjected to the wear introduced by carrying the full load in the bunk. Also, it requires a minimal amount of effort on the part of motors 60, 62 to adjust the angular position of the reach guide, thus effecting an energy saving in the operation of these motors.

One of the important advantages of the steering trailer, of course, is that the wheels supporting the trailer can be made to track exactly the rear wheels supporting the truck, regardless of the tightness of the turn. Such an advantage is readily attained by the trailer disclosed herein. For example, and referring again to the left turn situation shown in FIG. 5, wheel assemblies 28 have been adjusted to, and will, track in the path of the rear wheels of truck 12.

While a preferred embodiment of the invention has been described, it is appreciated that variations and modifications may be made without departing from the spirit of the invention.

It is claimed and desired to secure by Letters Patent:

1. A steerable trailer for elongated loads such as logs and the like comprising
    means for receiving a load to be carried by the trailer,
    means for transmitting to the ground the totality of the weight of any such load received by the load-receiving means, said transmitting means including a frame which mounts the load-receiving means, and ground-traveling support means which supports the frame for travel over the ground, and
    non-load-transmitting steering mechanism including a member accommodating coupling of the trailer to a towing vehicle, pivot means pivoting said coupling member on said frame for swinging about a generally upright axis, and means operatively interconnecting said coupling member and said frame for swinging the former relative to the latter to different adjusted positions about said axis.

2. The trailer of claim 1, wherein said frame includes an opening through which said coupling member extends, and said pivot means comprises a pair of generally vertically aligned pivot mechanisms disposed within said opening.

3. The trailer of claim 1, wherein said interconnecting means comprises a pair of double-acting fluid-actuated motors extending between said frame and said coupling member.

4. A steerable trailer for elongated loads such as logs and the like comprising
    a frame,
    ground-traveling support means supporting said frame for travel over the ground,
    means mounted on said frame for receiving a load to be carried by the trailer,
    said load-receiving means, frame and support means forming the sole structure in said trailer for transmitting to the ground the weight of a load received by the load-receiving means,
    an elongated coupling member accommodating coupling of the trailer to a towing vehicle, said coupling member extending generally in the direction in which the trailer moves when towed,
    non-load-bearing pivot means pivoting said coupling member on said frame for swinging about a generally upright pivot axis, and
    means operatively interconnecting said coupling member and said frame operable to swing the former relative to the latter to different adjusted positions about said pivot axis.

5. The trailer of claim 4, wherein said frame includes an opening through which said coupling member extends, and said pivot means comprises a pivot connection disposed within said opening.

6. The trailer of claim 4 wherein said interconnecting means comprises a pair of double-acting fluid-actuated motors extending between said frame and said coupling member.

7. A steerable log trailer comprising
    a frame,
    ground-traveling support means supporting said frame for travel over the ground,
    a log bunk for receiving a load of logs,
    first pivot means pivoting said bunk on said frame for swinging about a generally upright axis,
    said log bunk, first pivot means, frame and support means forming the sole structure in said trailer for transmitting load-created forces between the bunk and ground,
    an elongated generally horizontal reach guide,
    non-load-bearing second pivot means pivoting said reach guide on said frame for swinging also about a generally upright axis, and
    means operatively interconnecting said reach guide and said frame operable to swing the former relative to the latter to different adjusted positions about said second-mentioned axis.

8. The trailer of claim 7, wherein said frame includes an opening through which said reach guide extends, and said second pivot means comprises a pair of generally vertically aligned pivot mechanisms disposed within said opening.

9. The trailer of claim 7, wherein said interconnecting means comprises a pair of fluid-actuated motors extending between said reach guide and said frame.

10. A steerable trailer for elongated loads such as logs and the like comprising
    a frame having an opening extending longitudinally of the trailer, and means supporting the frame for travel over the ground,
    a load bunk for receiving a load, and a first pivot mechanism mounting the bunk on said frame for swinging about a generally upright axis,
    a coupling member accommodating coupling of the trailer to a towing vehicle,
    second and third pivot mechanisms disposed within said opening and pivoting upper and lower sides of said coupling member to said frame for swinging also about a generally upright axis, with the coupling member extending generally horizontally through the opening, and
    a pair of fluid-actuated motors operatively interconnecting said coupling member and said frame for swinging the former relative to the latter to different adjusted positions about said second-mentioned axis,
    said frame, where it surrounds said opening, being constructed whereby said second and third pivot mechanisms bear none of any load carried at any time by said load bunk.

* * * * *